United States Patent
Oh et al.

(10) Patent No.: US 9,162,200 B2
(45) Date of Patent: Oct. 20, 2015

(54) METHOD OF INJECTING AND REACTING SUPER-CRITICAL PHASE CARBON DIOXIDE WITHOUT PRESSURE LOSS

(71) Applicant: KOREA INSTITUTE OF GEOSCIENCE AND MINERAL RESOURCES, Daejeon (KR)

(72) Inventors: Jun-Ho Oh, Daejeon (KR); Kue-Young Kim, Daejeon (KR); Tae-Hee Kim, Daejeon (KR); Kwon-Gyu Park, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 0 days.

(21) Appl. No.: 14/453,467

(22) Filed: Aug. 6, 2014

(65) Prior Publication Data

US 2015/0044132 A1    Feb. 12, 2015

(30) Foreign Application Priority Data

Aug. 6, 2013  (KR) .................. 10-2013-0093066

(51) Int. Cl.
   *B01J 3/00*  (2006.01)
(52) U.S. Cl.
   CPC .............. *B01J 3/008* (2013.01); *B01J 2203/06* (2013.01)
(58) Field of Classification Search
   CPC ........................... B01J 3/008; B01J 2203/06
   See application file for complete search history.

(56) References Cited

U.S. PATENT DOCUMENTS

| | | | |
|---|---|---|---|
| 8,585,802 B2* | 11/2013 | Keller | 95/45 |
| 2003/0198585 A1* | 10/2003 | Salma et al. | 423/242.6 |
| 2004/0126311 A1* | 7/2004 | Sanderson et al. | 423/531 |
| 2013/0323614 A1* | 12/2013 | Chapman et al. | 429/420 |

FOREIGN PATENT DOCUMENTS

| | | |
|---|---|---|
| KR | 2000-0019837 | 4/2000 |
| KR | 10-2010-0054455 | 5/2010 |
| KR | 10-1166788 | 7/2012 |

OTHER PUBLICATIONS

Kang, et al., "Study for the Geochemical Reaction of Ca-feldspar, Amphibole and Olivine with Supercritical $CO_2$ and Brine on the $CO_2$ Sequestration Condition," Econ. Environ. Geol., 44(2), pp. 123-133, 2011.

* cited by examiner

*Primary Examiner* — Colleen Dunn
(74) *Attorney, Agent, or Firm* — Christie, Parker & Hale, LLP

(57) ABSTRACT

Disclosed is provided a method of injecting and reacting super-critical phase $CO_2$ without pressure loss. The method includes preparing gas phase $CO_2$, producing liquid phase $CO_2$ by pressurizing the prepared gas phase $CO_2$, producing super-critical phase $CO_2$ by adjusting a temperature of the produced liquid phase $CO_2$, filling incompressible fluid in a reactor and an injection line from an injection unit and pressurizing the incompressible fluid, injecting the produced super-critical phase $CO_2$ into the reactor, and controlling a pressure of the injected super-critical phase $CO_2$ by a pressure regulating unit.

6 Claims, 4 Drawing Sheets

METHOD OF INJECTING AND REACTING SUPER-CRITICAL PHASE CARBON DIOXIDE WITHOUT PRESSURE LOSS

CROSS-REFERENCE TO RELATED APPLICATION

This application claims the benefit under 35 U.S.C. §119 of Korean Patent Application No. 10-2013-0093066 filed on Aug. 6, 2013 in the Korean Intellectual Property Office, the entirety of which disclosure is incorporated herein by reference.

BACKGROUND OF THE INVENTION

1) Field of the Invention

The present invention relates to a method of injecting and reacting super-critical phase carbon dioxide ($CO_2$), and more particularly to a method of continuously maintaining the pressure of super-critical phase $CO_2$ so that the pressure of the super-critical phase $CO_2$ is not lost, that is, the super-critical phase of the super-critical phase $CO_2$ is not broken when a sample reacts with the super-critical phase $CO_2$ by injecting the super-critical phase $CO_2$ into a reactor during a reaction test of the sample based on the super-critical phase $CO_2$.

2) Background of Related Art

Super-critical phase carbon dioxide ($CO_2$) has been usefully used for various purposes.

Hereinafter, the super-critical phase $CO_2$ will be described. A super-critical phase of $CO_2$ refers to a fluid state of $CO_2$ representing both characteristics of liquid and gas phases at a critical point which represents a pressure is 73.8 bar and temperature is 31.1° C. or more.

In this case, the super-critical phase CO2 fluid has the permeability of gas and the high density of liquid to represent advantages of both the gas and the liquid.

In addition, if $CO_2$ becomes the super-critical phase CO2, the surface tension hardly exists. Accordingly, the super-critical phase $CO_2$ may permeate a long narrow gap that liquid cannot permeate. In addition, since the super-critical phase $CO_2$ exists in a high density state that is impossible to gas, the solubility of various materials may be increased.

Since the super-critical phase $CO_2$ has unique physical and chemical properties as described above, various reaction devices have been designed based on the reactivity of the super-critical phase $CO_2$.

In particular, in order to reduce $CO_2$ serving as the main culprit of greenhouse gas from the air, the $CO_2$ has been produced in a super-critical phase and injected into an underground or undersea sedimentary layer. Therefore, devices for injecting and reacting the super-critical phase $CO_2$ have been designed in order to simulate the reaction mechanism of the super-critical phase $CO_2$ in the sedimentary layer.

However, the device for injecting and reacting the super-critical phase $CO_2$ according to the related art simply directly injects the super-critical phase CO2 produced from a booster pump into a reactor.

Accordingly, when the super-critical phase CO2 produced from the booster pump is injected into the reactor through a tube, pressure loss occurs in the tube, so that the super-critical phase $CO_2$ is adiabatic-expanded in the tube, which causes the temperature and pressure of the super-critical phase $CO_2$ to be lowered.

As described above, the super-critical phase $CO_2$ may exist in a state of a super-critical fluid having both of liquid and gas characteristics at a critical point, that is, at the pressure of 73.8 bars and the temperature of 31.1° C. or more. However, the critical point cannot be maintained due to the adiabatic expansion, so that the phase of the super-critical phase $CO_2$ is changed. Accordingly, undesirable reaction may be caused in a reaction experiment of the sample in the reactor.

As a related art, there is Korean Unexamined Patent Publication No. 10-2000-0019837 (published on Apr. 15, 2000) titled "The cement lining manufacturing device within the drum using the supercritical carbon dioxide").

SUMMARY OF THE INVENTION

An object of the present invention is to provide a method of making a reaction of reproducing a real geological storage environment of $CO_2$ through the reaction between a sample and super-critical phase $CO_2$ without phase change resulting from adiabatic expansion of the super-critical phase $CO_2$ by minimizing temperature and pressure loss in a reaction experiment using the super-critical phase $CO_2$.

The present invention suggests several objects without limitation to the above objects, and other objects, which are not described, can be clearly comprehended from the following description by those skilled in the art.

In order to accomplish the above object, there is provided a method of injecting and reacting super-critical phase $CO_2$ without pressure loss. The method includes preparing gas phase $CO_2$, producing liquid phase $CO_2$ by pressurizing the prepared gas phase $CO_2$, producing super-critical phase $CO_2$ by adjusting a temperature of the produced liquid phase $CO_2$, filling incompressible fluid in a reactor and an injection line from an injection unit and pressurizing the incompressible fluid, injecting the produced super-critical phase $CO_2$ into the reactor, and controlling a pressure of the injected super-critical phase $CO_2$ by a pressure regulating unit.

The gas phase $CO_2$ is changed into the liquid phase $CO_2$ by pressurizing the gas phase $CO_2$ to a pressure at a critical point by a booster pump and transferred to a piston pump provided next to the booster pump, the liquid phase $CO_2$ is changed into the super-critical phase $CO_2$ by heating the liquid phase $CO_2$ to a temperature at the critical point or more by a heater installed at an outer peripheral portion of a pump body when the liquid phase $CO_2$ passes through the pump body of the piston pump, water or salt water is filled as the incompressible fluid and the super-critical phase $CO_2$ is pressurized beyond the critical point, and the super-critical phase $CO_2$ injected into the reactor is maintained at the critical point by using a thermometer and a pressure gauge, such that the super-critical phase $CO_2$ reacts with a sample in the reactor without phase change of the super-critical phase $CO_2$.

In this case, the liquid phase $CO_2$ is preferably produced through the pressurizing by a booster pump, and the pressure for the pressurizing is 73.8 bar or more.

In addition, super-critical phase CO2 is preferably produced by a piston pump, and the temperature for the heating is 31.1° C. or more.

The incompressible fluid may water or salt water.

There is provided a method of injecting and reacting super-critical phase $CO_2$ without pressure loss. The method includes (A) filling incompressible fluid in a reactor and an injection line from an injection unit and pressurizing the incompressible fluid, (B) preparing gas phase $CO_2$, (C) producing liquid phase $CO_2$ by pressurizing the prepared gas phase $CO_2$, (D) producing super-critical phase $CO_2$ by adjusting a temperature of the produced liquid phase $CO_2$, (E) injecting the produced super-critical phase $CO_2$ into the reactor, and (F) controlling a pressure of the injected super-critical phase $CO_2$ by a pressure regulating unit.

The super-critical phase $CO_2$ injected into the reactor pushes the filled incompressible fluid out of the reactor in step (E).

The details of other embodiments can be understood by those skilled in the art with respect to the detailed description and accompanying drawings.

The objects, the specific advantages, and the novel features of the present invention will be apparently comprehended by those skilled in the art based on the embodiments, which are detailed later in detail, together with accompanying drawings. However, the present invention is not limited to embodiments disclosed below, but variously modified. The present embodiment makes the disclosure of the present invention perfect and makes those skilled in the art clearly understand the scope of the present invention. The present invention is defined by the scope of accompanying claims.

The same reference numerals will be assigned to the same elements throughout the whole detailed description. The sizes and positions of the elements and the relationship between the elements may be exaggerated in order to clarify the detailed description.

As described above, according to the present invention, in the reaction experiment using the super-critical phase $CO_2$ in the laboratory, since the pressure loss of the super-critical phase $CO_2$ can be prevented, the phase change of the super-critical phase $CO_2$ can be prevented. Therefore, the reaction mechanism of the super-critical phase $CO_2$ under the ground can be exactly simulated.

DETAILED DESCRIPTION OF THE INVENTION

Hereinafter, a method of injecting and reacting super-critical phase $CO_2$ without pressure loss according to an exemplary embodiment of the present invention will be described in detail with reference to accompanying drawings.

Prior to the description of the method of injecting and reacting super-critical phase $CO_2$ without pressure loss according to an exemplary embodiment of the present invention, the structure of a basic apparatus for realizing the method will be described below.

Figure 1:
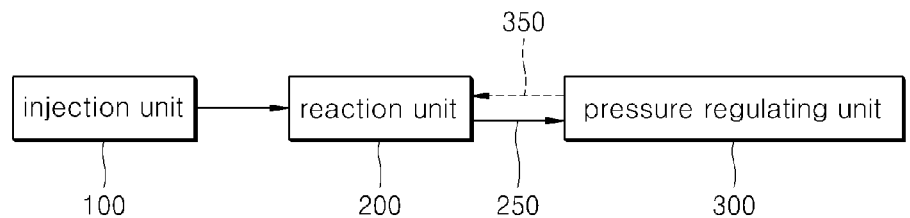
FIG. 1 is a block diagram schematically showing the structure of an apparatus for injecting and reacting super-critical phase CO2 without pressure loss according to an exemplary embodiment of the present invention.

FIG. 1 is a block diagram schematically showing the structure of an apparatus for injecting and reacting super-critical phase $CO_2$ without pressure loss according to an exemplary embodiment of the present invention.

As shown in FIG. 1, the apparatus for injecting and reacting the super-critical phase $CO_2$ without pressure loss may include an injection unit 100, a reaction unit 200, and a pressure regulating unit 300.

Those skilled in the art should recognize that the structure of the injection unit 100, the reaction unit 200, and the pressure regulating unit 300 is provided to explain the method of injecting and reacting super-critical phase CO2 without pressure loss according to an exemplary embodiment of the present invention.

The injection unit 100 changes gas phase $CO_2$ into liquid phase $CO_2$ and super-critical phase $CO_2$, and the reaction unit 200 makes reaction between the super-critical phase $CO_2$ and the sample. The pressure regulating unit 300 regulates the discharge pressure of the super-critical phase $CO_2$ injected from the injection unit 100 and the discharge pressure of an incompressible fluid in the reaction unit 200.

In FIG. 1, an arrow from the injection unit 100 to the reaction unit 200 represents a direction in which a pressure is transmitted. Similarly, an arrow 250 represents pressure transmission from the reaction unit 200 to the pressure regulating unit 300.

An arrow 350 refers to pressure regulation of the reaction unit 200 by the pressure regulating unit 300.

Hereinafter, the constitution related to the pressure regulation of the reaction unit 200 by the pressure regulating unit 300 will be described below.

The method of injecting and reacting super-critical phase $CO_2$ without pressure loss according to the exemplary embodiment of the present invention will be described below with reference to FIGS. 2 to 4.

Figure 2:
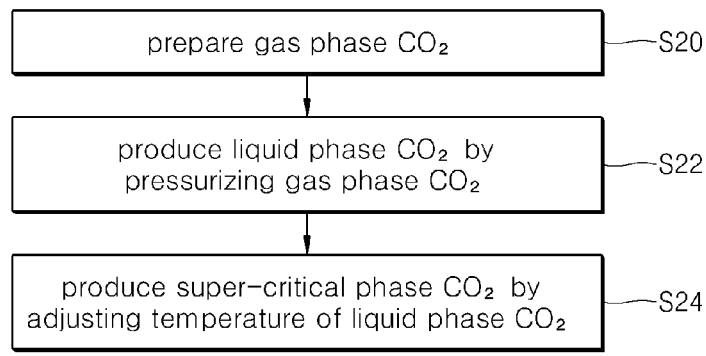
FIG. 2 is a flowchart schematically showing a first step in a method of injecting and reacting super-critical phase CO2 without pressure loss according to an exemplary embodiment of the present invention.

FIG. 2 is a flowchart schematically showing a first step in the method of injecting and reacting super-critical phase $CO_2$ without pressure loss according to an exemplary embodiment of the present invention. FIG. 3 is a flowchart schematically showing a second step in the method of injecting and reacting super-critical phase $CO_2$ without pressure loss according to an exemplary embodiment of the present invention. FIG. 4 is a flowchart schematically showing a third step in the method of injecting and reacting super-critical phase $CO_2$ without pressure loss according to an exemplary embodiment of the present invention.

Figure 3:
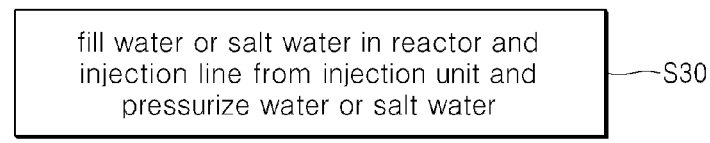
FIG. 3 is a flowchart schematically showing a second step in the method of injecting and reacting super-critical phase CO2 without pressure loss according to an exemplary embodiment of the present invention.
Figure 4:
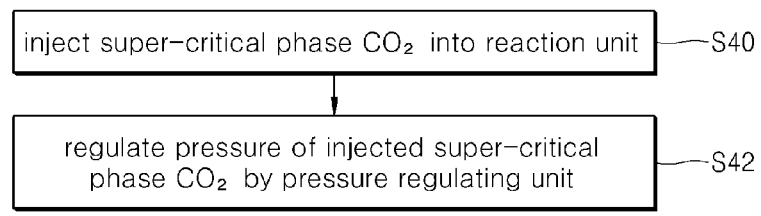
FIG. 4 is a flowchart schematically showing a third step in the method of injecting and reacting super-critical phase CO2 without pressure loss according to an exemplary embodiment of the present invention.

In this case, FIG. 2 shows the main reaction by the injection unit 100, FIG. 3 shows the main reaction by the reaction unit 200, and FIG. 4 shows the main reaction by the pressure regulating unit 300.

As shown in FIG. 2, a step of preparing gas phase CO2 (step S20), a step of producing liquid phase CO2 by pressurizing the gas phase $CO_2$ (step S22), and a step of producing super-critical phase $CO_2$ by adjusting the temperature of the liquid phase $CO_2$ (step S24) may be performed.

In this case, according to the step of preparing gas phase $CO_2$ (step S20), gas phase $CO_2$ having high purify, for example gas phase $CO_2$ having 99.9% of purity is prepared. In this case, the purity of the $CO_2$ may be slightly changed.

Subsequently, the step of producing liquid phase CO2 by pressurizing the prepared gas phase $CO_2$ may be performed (step S22). In this case, the liquid phase $CO_2$ is preferably pressurized by using a booster pump. In addition, the liquid phase $CO_2$ is preferably pressurized to a minimum pressure to form the super-critical phase $CO_2$, that is, to at least 73.8 bars at the critical point.

Next, the step of producing super-critical phase $CO_2$ by adjusting the temperature of the liquid phase $CO_2$ may be performed (step S24).

In this case, the liquid phase $CO_2$ is preferably changed into the super-critical phase $CO_2$ by a piston pump and a heater to heating the piston pump.

In addition, the heating is performed to the minimum temperature, that is, at least the temperature of 31.1° C. at the critical point in order to prepare the above super-critical phase $CO_2$.

Meanwhile, as shown in FIG. 3, in the reaction unit 200, water or salt water is filled in the reactor and the injection line from the injection unit 100 and pressurized (step S30).

The step S30 shown in FIG. 3 is to fill water or salt water, which is incompressible fluid, in the whole injection line from the injection unit 100 and the inner part of the reactor and to pressurize the water or the salt water.

In this case, the pressurizing may be performed at the critical point of the super-critical phase $CO_2$ or more.

In this case, the water or the salt water is representative incompressible fluid, which is used to reproduce a geographical storage environment of $CO_2$.

The sequence in the flowcharts shown in FIGS. 2 and 3 may be changed. In other words, the step of first generating the super-critical phase $CO_2$ or the step of filling the incompressible fluid in the reactor or pressurizing the incompressible fluid may be mutually independently performed.

In this case, the detailed mechanism of filling the incompressible fluid in the reactor and the injection line and pressurizing the incompressible fluid in step S30 will be described later with reference to the structure of the apparatus for injecting and reacting the super-critical phase $CO_2$ without pressure loss shown in FIGS. 5 and 6.

Next, as shown in FIG. 4, the method of injecting and reacting the super-critical phase $CO_2$ without pressure loss according to one embodiment of the present invention further includes a step of injecting the super-critical phase $CO_2$ in the reactor by the injection unit 100 (step S40) and a step of regulating the pressure of the injected super-critical phase $CO_2$ (step S42).

Similarly to the steps shown in FIG. 1, the steps shown in FIG. 4 represent the step of first injecting the super-critical phase $CO_2$ in the reactor by the injection unit 100 and the step of controlling the pressure of the injected super-critical phase $CO_2$ by the pressure regulating unit 300.

In this case, the detailed mechanism of pressure regulation or pressure control by the pressure regulating unit 300 in step S42 will be described later with reference to the structure of the apparatus for injecting and reacting the super-critical phase $CO_2$ without pressure loss shown in FIGS. 6 and 7.

Hereinafter, the structure of the apparatus for injecting and reacting the super-critical phase $CO_2$ without pressure loss employed in the method of injecting and reacting the super-critical phase $CO_2$ without pressure loss according to an exemplary embodiment of the present invention will be described with reference to FIGS. 5 to 7.

Figure 5:
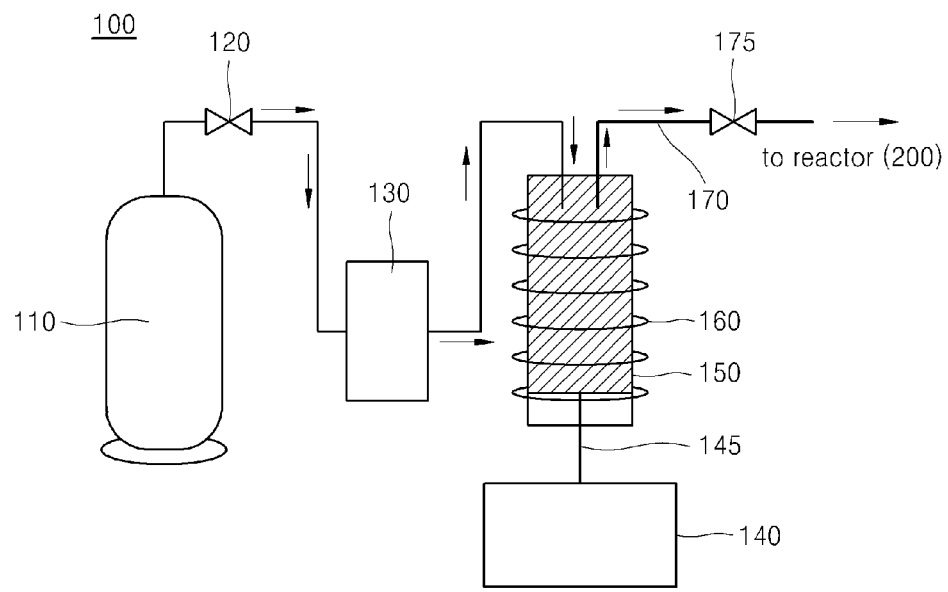
FIG. 5 is a schematic view showing the structure of an injection unit in the structure of the apparatus for injecting and reacting super-critical phase $CO_2$ without pressure loss.

FIG. 5 is a schematic view showing the structure of the injection unit in the structure of the apparatus for injecting and reacting super-critical phase $CO_2$ without pressure loss. FIG. 6 is a schematic view showing the structure of the reaction unit in the structure of the apparatus for injecting and reacting super-critical phase CO2 without pressure loss. FIG. 7 is a schematic view showing the structure of the pressure regulating unit in the structure of the apparatus for injecting and reacting super-critical phase $CO_2$ without pressure loss.

Referring to FIG. 5, the injection unit 100 includes a gas phase $CO_2$ storage tank 110, a first valve 120 coupled with the gas phase $CO_2$ storage tank 110, a booster pump 130 coupled with the first valve 120, a piston pump 140 coupled with the booster pump 130 to change the phase of CO2 into a super-critical phase, and a second valve 170 coupled with the piston pump 140.

The details of functions of tubes coupling the components shown in FIG. 5 with each other will be omitted. The tubes are used to transfer gas phase $CO_2$, liquid phase CO2, and super-critical phase $CO_2$.

In this case, the gas phase CO2 storage tank 110 preferably stores gas phase $CO_2$ having high purify, for example gas phase $CO_2$ having 99.9% of purity.

Since the first and second valves 120 and 175 shown in FIG. 5 have structures opened or closed if necessary, the uses of the first and second valves 120 and 175 can be easily understood by those skilled in the art.

Subsequently, the booster pump 130 coupled with the first valve 120 presses gas phase $CO_2$ from the gas phase $CO_2$ storage tank 110 and transfers the pressurized gas phase $CO_2$ to the piston pump 140. In this case, the booster pump 130 pressurizes the gas phase $CO_2$ to the pressure at the critical point for the supply of the gas phase $CO_2$.

If the gas phase $CO_2$ is pressurized to the pressure at the critical point by the booster pump 130, the gas phase CO2 is changed into the liquid phase $CO_2$.

In addition, the liquid phase $CO_2$ may be changed into the super-critical phase $CO_2$ while passing through a pump body 150 of the piston pump 140.

In this case, since a heater 160 is installed at a peripheral portion of the pump body 150 of the piston pump 140 shown in FIG. 5, the temperature of the liquid phase $CO_2$ pressurized and supplied into the pump body 150 may be adjusted, and the pressurized and supplied liquid phase $CO_2$ may be changed into the super-critical phase $CO_2$ finally.

In this case, the heater 160 has a structure in which $CO_2$ is heated to at least temperature at the critical point so that super-critical $CO_2$ can be formed as described above.

Meanwhile, reference numeral 145 shown in FIG. 5 represents a pump shaft of the piston pump 140.

Actually, the injection unit 100 shown in FIG. 5 has the same structure as that of an injection unit of a reactor according to the related art.

If the gas phase $CO_2$ is pressurized by the booster pump 130 in FIG. 5, the gas phase $CO_2$ is changed into the liquid phase $CO_2$ only, and not changed into the super-critical phase $CO_2$.

In detail, after the gas phase $CO_2$ is supplied to the piston body 150 of the piston pump through the booster pump 130 and heated to a high temperature by the heater 160, the gas phase $CO_2$ is changed into the super-critical phase $CO_2$.

In order to express the above description, an inner part of the pump body 150 of the piston pump 140 shown in FIG. 5 is emphasized by oblique lines 155 and a tube 170 coupled with the piston pump 140 is expressed by a bold line.

In other words, only the $CO_2$, which has passed through the pump body 150 of the piston body 140, become the super-critical phase $CO_2$.

A second valve 175 shown in FIG. 5 may open or cut off the supply of the super-critical phase $CO_2$ by the piston pump 140.

Hereinafter, the structure of the reaction unit in the structure of the apparatus for injecting and reacting super-critical phase $CO_2$ without pressure loss will be described in detail with reference to FIG. 6.

Figure 6:
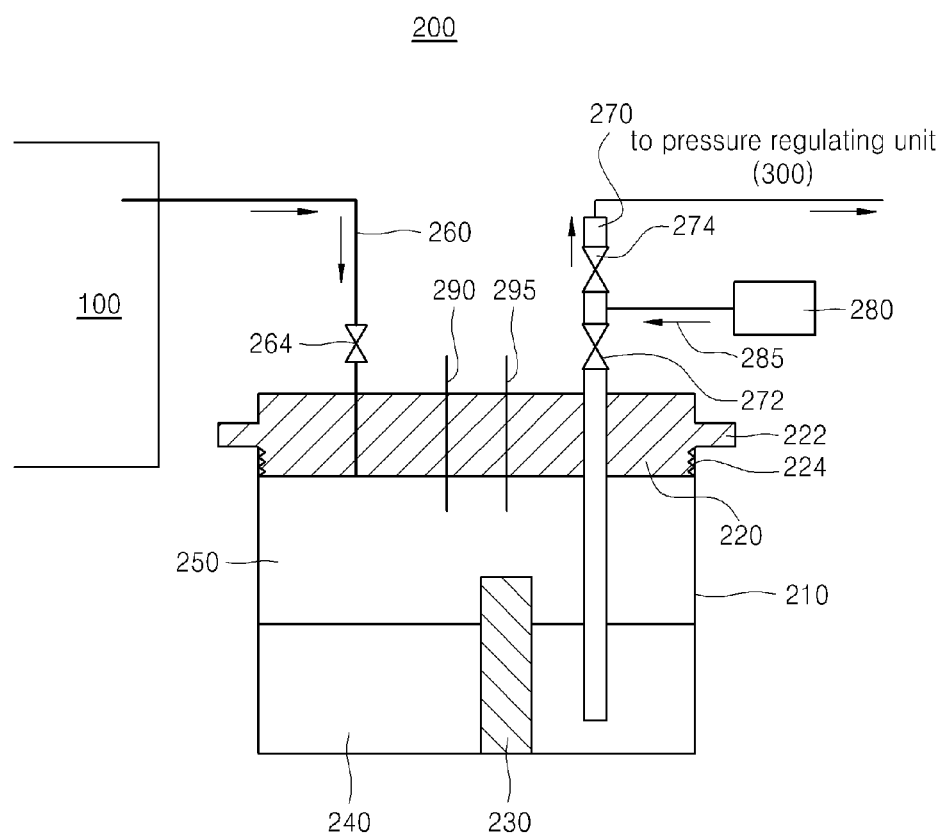
FIG. 6 is a schematic view showing the structure of a reaction unit in the structure of the apparatus for injecting and reacting super-critical phase $CO_2$ without pressure loss.

FIG. 6 is a schematic view showing the structure of the reaction unit in the structure of the apparatus for injecting and reacting super-critical phase $CO_2$ without pressure loss.

Referring to FIG. 6, a reaction unit 200 in the structure of the apparatus for injecting and reacting super-critical phase $CO_2$ without pressure loss includes a reactor 210, a cover 220 to cover an upper portion of the reactor 210, a tube 260 allowing $CO_2$ supplied in a super-critical phase from the injection unit 100 to flow and inserted into the cover 220, a discharge tube 270 to discharge fluid in the reactor 210, and a booster pump 280 to supply the incompressible fluid into the reactor 210 through the discharge tube 270.

In FIG. 6, third, fourth, and fifth valves 262, 272, and 274 can be openable if necessary. Although the operating mechanism of each valve has a conventional structure, parts related to the method according to the present invention will be described below in detail.

As shown in FIG. 6, in order to express $CO_2$ supplied in the super-critical state from the injection unit 100, the tube 260 is expressed by a bolder line when comparing with another tube.

In this case, although the tube 260 is provided through the cover 220, the tube 260 does not extend downward to a floor of the reactor 210 through the cover 220 differently from the discharge tube 270 provided in the cover 270.

The above structure is sufficient for the purpose of supplying the super-critical phase $CO_2$ into the reactor 210 by applying a pressure.

Further, preferably, the tube 260 serves as an inlet port to inject the super-critical phase CO2. Preferably, the discharge tube 270 serves as an outlet port to discharge incompressible fluid, such as water or salt water, filled therein or pressurized by the booster pump 280 or to discharge the super-critical $CO_2$ injected the tube 260. Further, in FIG. 6, reference numeral 240 represents water or salt water serving as incompressible fluid, and reference numeral 250 represents super-critical phase $CO_2$ supplied through the tube 260.

The water or the salt water, which is used to simulate the reaction mechanism of the super-critical phase $CO_2$ when $CO_2$ is geologically stored, serves as incompressible fluid.

A sample 230 is preferably provided in the reactor 210.

In this case, the reactor 210 may be screwed with the cover 220. According to one embodiment, a screw coupling part is represented by reference numeral 224.

In order to facilitate the screw-coupling between the reactor 210 and the cover 220, an external handle 222 may be additionally provided.

Preferably, a thermometer 290 and a pressure gauge 295 are additionally installed in order to measure the internal temperature and pressure of the reactor 210.

The temperature and pressure of the super-critical phase $CO_2$ supplied into the reactor 210 can be more precisely controlled by the thermometer 290 and the pressure gauge 295. In other words, the super-critical phase $CO_2$ can be effectively maintained at the critical point by the thermometer 290 and the pressure gauge 295.

Meanwhile, in order to control the internal temperature of the reactor 210, a furnace may be additionally installed at an outer peripheral portion of the reactor 210.

Hereinafter, the structure of the pressure regulating unit 200 in the apparatus for injecting and reacting super-critical phase $CO_2$ without pressure will be described.

Figure 7:
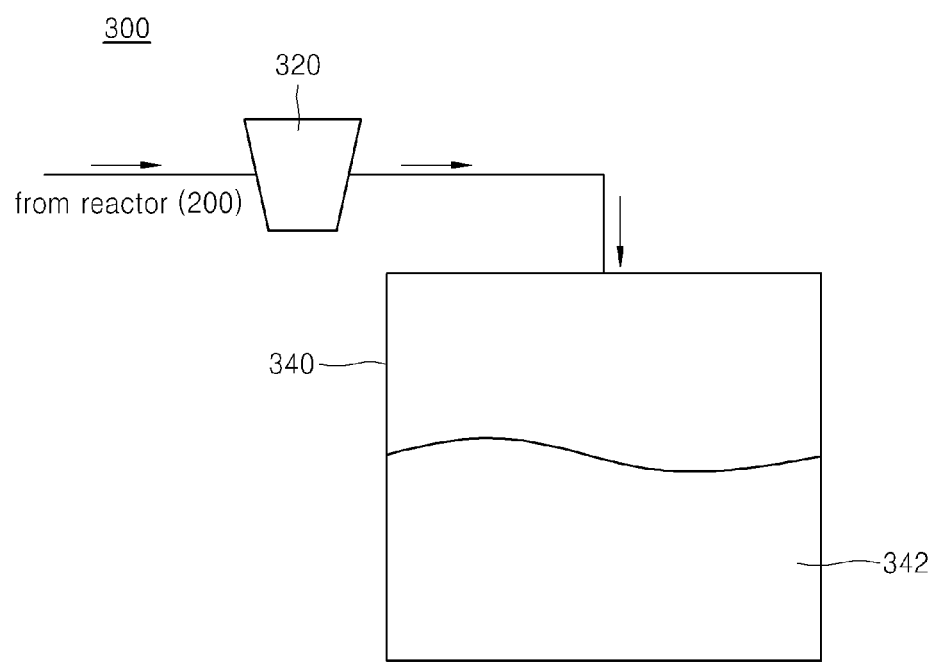
FIG. 7 is a schematic view showing the structure of a pressure regulating unit in the structure of the apparatus for injecting and reacting super-critical phase $CO_2$ without pressure loss.

FIG. 7 is a schematic view showing the structure of the pressure regulating unit 200 in the structure of the apparatus for injecting and reacting super-critical phase $CO_2$ without pressure loss.

Referring to FIG. 7, the pressure regulating unit 200 in the apparatus for injecting and reacting super-critical phase $CO_2$ without pressure includes backpressure regulators (BPR) 320 to control the pressure of the incompressible fluid discharged from the reaction unit 200 shown in FIG. 6 and a fluid collecting part 340.

The BPR 320 maintains the internal pressure of the reactor 210 shown in FIG. 2 to 73.8 bar or more if the pressure at the critical point of the super-critical phase $CO_2$ is set to, for example 73.8 bar or more.

Preferably, the BPR 320 may be maintained at pressure exceeding that at the critical point.

Meanwhile, the fluid collecting part 340 collects the incompressible fluid discharged from the reactor 210 shown in FIG. 6. The incompressible fluid may include water or salt water as described above.

If an amount of the incompressible fluid collected in the fluid collecting part 340 is measured, an amount of super-critical phase $CO_2$ injected into the reactor 210 shown in FIG. 6 may be exactly measured.

In this case, an amount of the incompressible fluid collected in the fluid collecting part 340 may be measured by an electronic scale (not shown).

Meanwhile, the incompressible fluid collected in the fluid collecting part 340 is represented by reference numeral 342.

In this case, the discharge of the incompressible fluid collected in the fluid collecting unit 340 may be controlled by the BPR 320.

Finally, the whole constitution in the method injecting and reacting super-critical phase $CO_2$ without pressure loss according to an exemplary embodiment of the present invention will be described below.

Gas phase $CO_2$ is changed into liquid phase $CO_2$ by the booster pump 130, and the liquid phase CO2 is changed into super-critical phase $CO_2$ through the piston pump 140.

In this case, according to the present invention, in order to prevent the adiabatic expansion of the super-critical phase $CO_2$, the super-critical phase $CO_2$ is not directly injected into the reactor 210.

In this case, as described above, a step that may be altered with the step of producing the super-critical phase $CO_2$ in terms of sequence is performed. In other words, the step of filling the incompressible fluid in the reactor 210 by using the booster pump 280 of FIG. 6 is selectively performed.

In this case, the incompressible fluid is filled in not only the reactor 210, but only up to the tube 260 inserted into the cover 220 provided on an upper portion of the reactor 210. Preferably, the incompressible fluid is fully filled in a tube space up to the second valve 175.

Accordingly, air or other foreign matters staying in the reactor 210 and the tube 260 are completely removed from the reactor 210 and the tube 260.

To this end, a vent (not shown) may be additionally formed in the tube 260 to easily discharge the air or the other foreign matters.

In addition, preferably, the booster pump 280 has a structure of pressurizing the discharge tube 270 and the inner part of the reactor 210 at the same pressure as that of the super-critical phase $CO_2$ produced from the injection unit 100. In this case, preferably, the fifth valve 274 is closed.

As described above, pressure equalizing is made before the super-critical phase $CO_2$ is injected into the reactor 210 through the tube 260 by using the piston pump 140.

In this case, since the super-critical phase $CO_2$ injected into the reactor 210 represents low density, the super-critical phase $CO_2$ 250 exists at an upper portion of the incompressible fluid 240 previously injected into the reactor 210.

The incompressible fluid 240 in the reactor 210 is discharged to the fluid collecting part 340 of the pressure regulating unit 300 through the discharge tube 270 due to the pressure of the super-critical phase $CO_2$ supplied through the tube 260.

In this case, as described above, since the pressure at the critical point of the super-critical phase $CO_2$ may be continuously maintained by the BPR 320, the pressure is not lowered overall, so that the adiabatic expansion of the super-critical phase $CO_2$ is not made.

The total amount of the super-critical phase $CO_2$ 250 injected into the reactor 219 can be exactly detected based on an amount of the incompressible fluid discharged to the fluid collecting part 340.

As described above, although the method of injecting and reacting the super-critical phase $CO_2$ without pressure loss according to an exemplary embodiment of the present invention has been described, the method is provided for illustrative purpose. The present disclosure is not limited to the above-mentioned examples and various modifications can be made by those skilled in the art without departing from the scope of the appended claims. In addition, these modified examples should not be appreciated separately from technical spirits or prospects.

What is claimed is:

1. A method of injecting and reacting super-critical phase carbon dioxide without pressure loss, the method comprising:
   (A) preparing gas phase carbon dioxide;
   (B) producing liquid phase carbon dioxide by pressurizing the prepared gas phase carbon dioxide;
   (C) producing super-critical phase carbon dioxide by adjusting a temperature of the produced liquid phase carbon dioxide;
   (D) filling incompressible fluid in a reactor and an injection line from an injection unit and pressurizing the incompressible fluid;
   (E) injecting the produced super-critical phase carbon dioxide into the reactor; and
   (F) controlling a pressure of the injected super-critical phase carbon dioxide by a pressure regulating unit,
   wherein the gas phase carbon dioxide is changed into the liquid phase carbon dioxide by pressurizing the gas phase carbon dioxide to a pressure at a critical point by a booster pump and transferred to a piston pump provided next to the booster pump in step (B),
   the liquid phase carbon dioxide is changed into the super-critical phase carbon dioxide by heating the liquid phase carbon dioxide to a temperature at the critical point or more by a heater installed at an outer peripheral portion of a pump body when the liquid phase carbon dioxide passes through the pump body of the piston pump in step (C),
   water or salt water is filled as the incompressible fluid and the super-critical phase carbon dioxide is pressurized beyond the critical point in step (D), and
   the super-critical phase carbon dioxide injected into the reactor is maintained at the critical point by using a thermometer and a pressure gauge in step (E), such that the super-critical phase carbon dioxide reacts with a sample in the reactor without phase change of the super-critical phase carbon dioxide.

2. The method of claim 1, wherein the pressure at the critical point for the pressurizing by the booster pump is 73.8 bars.

3. The method of claim 1, wherein the temperature at the critical point for the heating by the heater is 31.1° C.

4. A method of injecting and reacting super-critical phase carbon dioxide without pressure loss, the method comprising:
   (A) filling incompressible fluid in a reactor and an injection line from an injection unit and pressurizing the incompressible fluid;
   (B) preparing gas phase carbon dioxide;
   (C) producing liquid phase carbon dioxide by pressurizing the prepared gas phase carbon dioxide;
   (D) producing super-critical phase carbon dioxide by adjusting a temperature of the produced liquid phase carbon dioxide;
   (E) injecting the produced super-critical phase carbon dioxide into the reactor; and
   (F) controlling a pressure of the injected super-critical phase carbon dioxide by a pressure regulating unit,
   wherein water or salt water is filled as the incompressible fluid in step (A),
   the gas phase carbon dioxide is changed into the liquid phase carbon dioxide by pressurizing the gas phase carbon dioxide to a pressure at a critical point by a booster pump and transferred to a piston pump provided next to the booster pump in step (C),
   the liquid phase carbon dioxide is changed into the super-critical phase carbon dioxide by heating the liquid phase carbon dioxide to at least a temperature at the critical point by a heater installed at an outer peripheral portion of a pump body when the liquid phase carbon dioxide passes through the pump body of the piston pump in step (D), and
   the super-critical phase carbon dioxide injected into the reactor is maintained at the critical point by using a thermometer and a pressure gauge, and the super-critical phase carbon dioxide injected into the reactor pushes the filled incompressible fluid out of the reactor in step (E), such that the super-critical phase carbon dioxide reacts with a sample in the reactor without phase change of the super-critical phase carbon dioxide.

5. The method of claim 4, wherein the pressure at the critical point for the pressurizing by the booster pump is 73.8 bars.

6. The method of claim 4, wherein the temperature at the critical point for the heating by the heater is 31.1° C.

* * * * *